April 7, 1936.   T. W. BRADLEY   2,036,391
RELIEF VALVE FOR UNFIRED PRESSURE VESSELS
Original Filed June 28, 1930   3 Sheets-Sheet 3
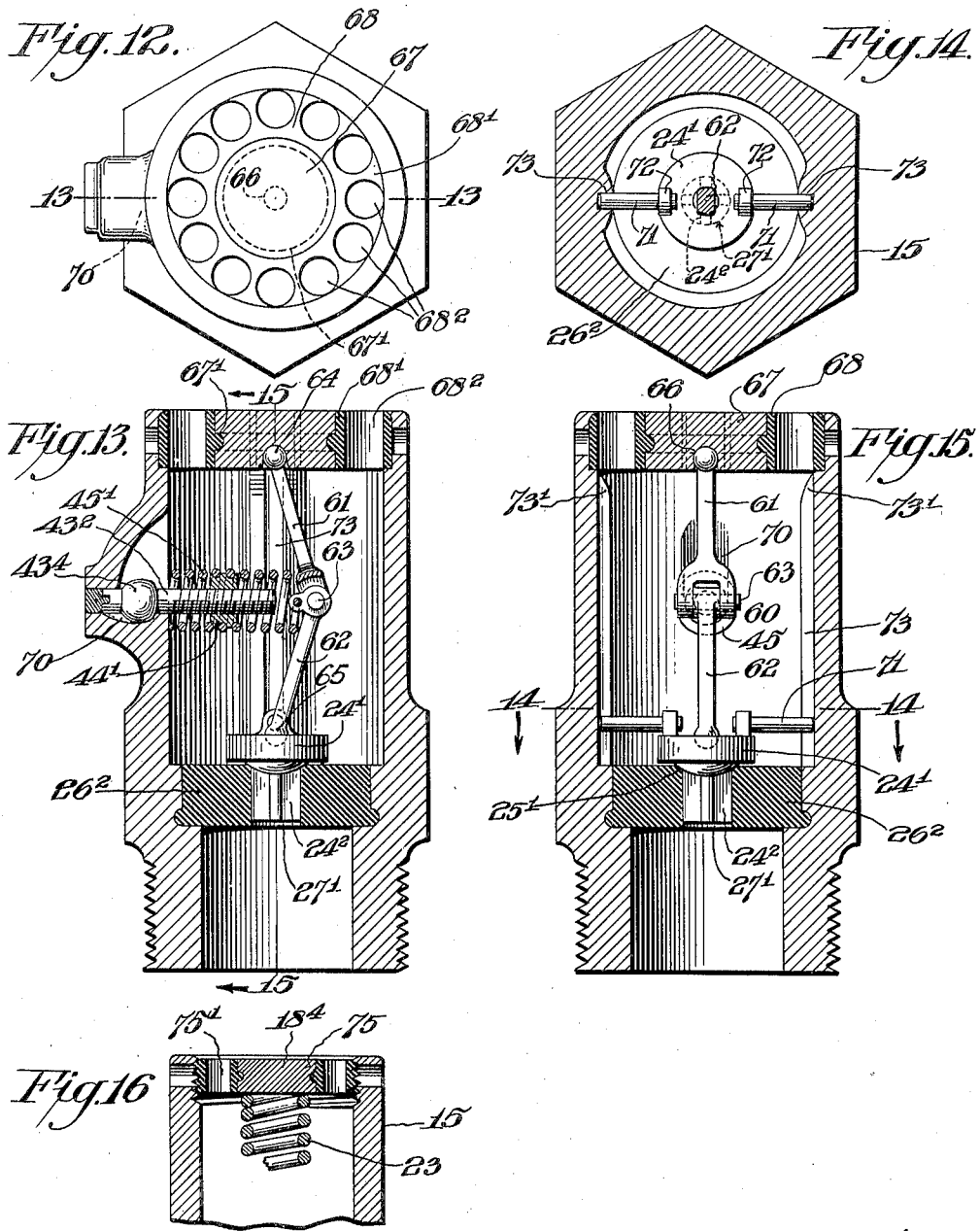
Witness:
Inventor
Thomas W. Bradley,
By
Attorney.

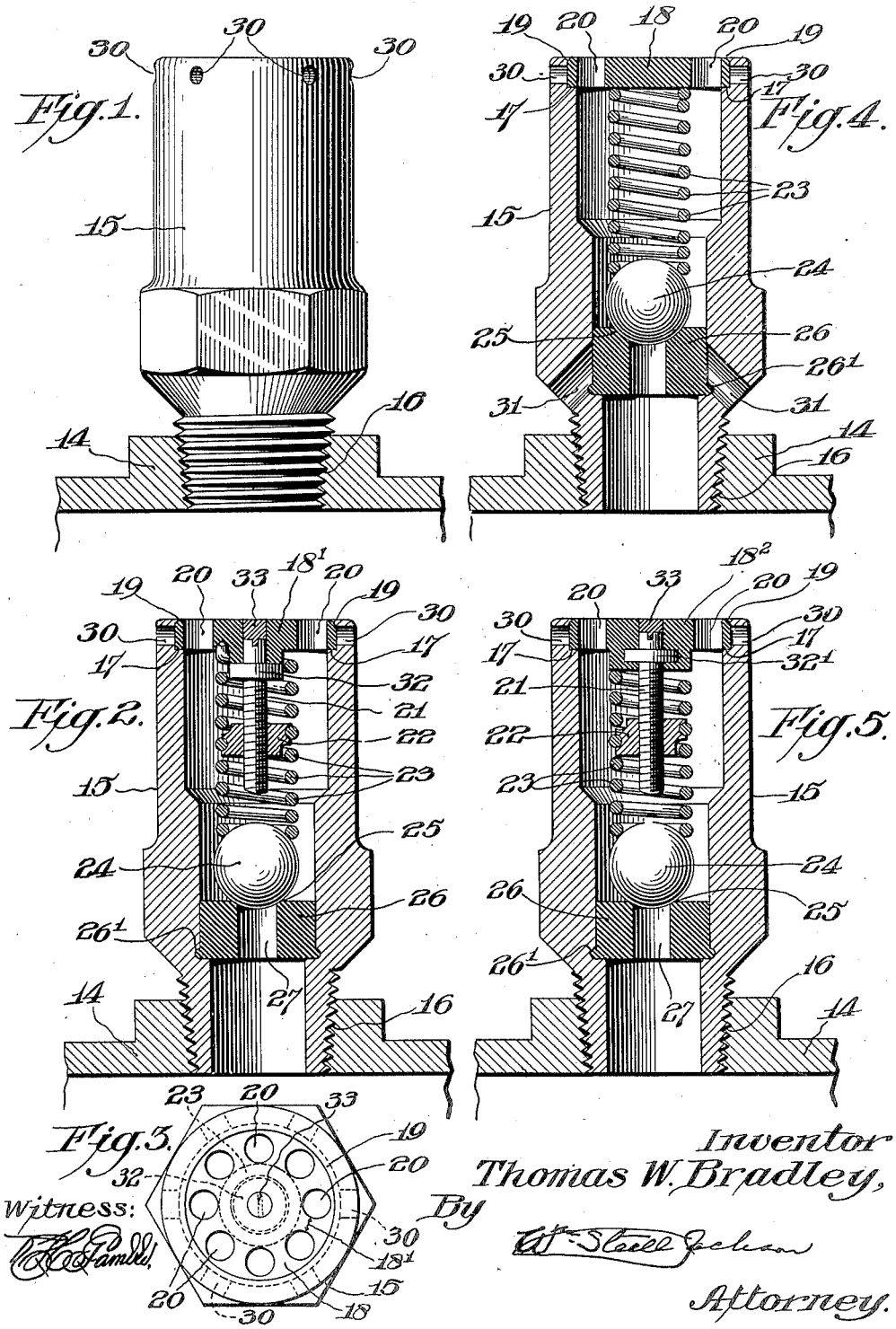

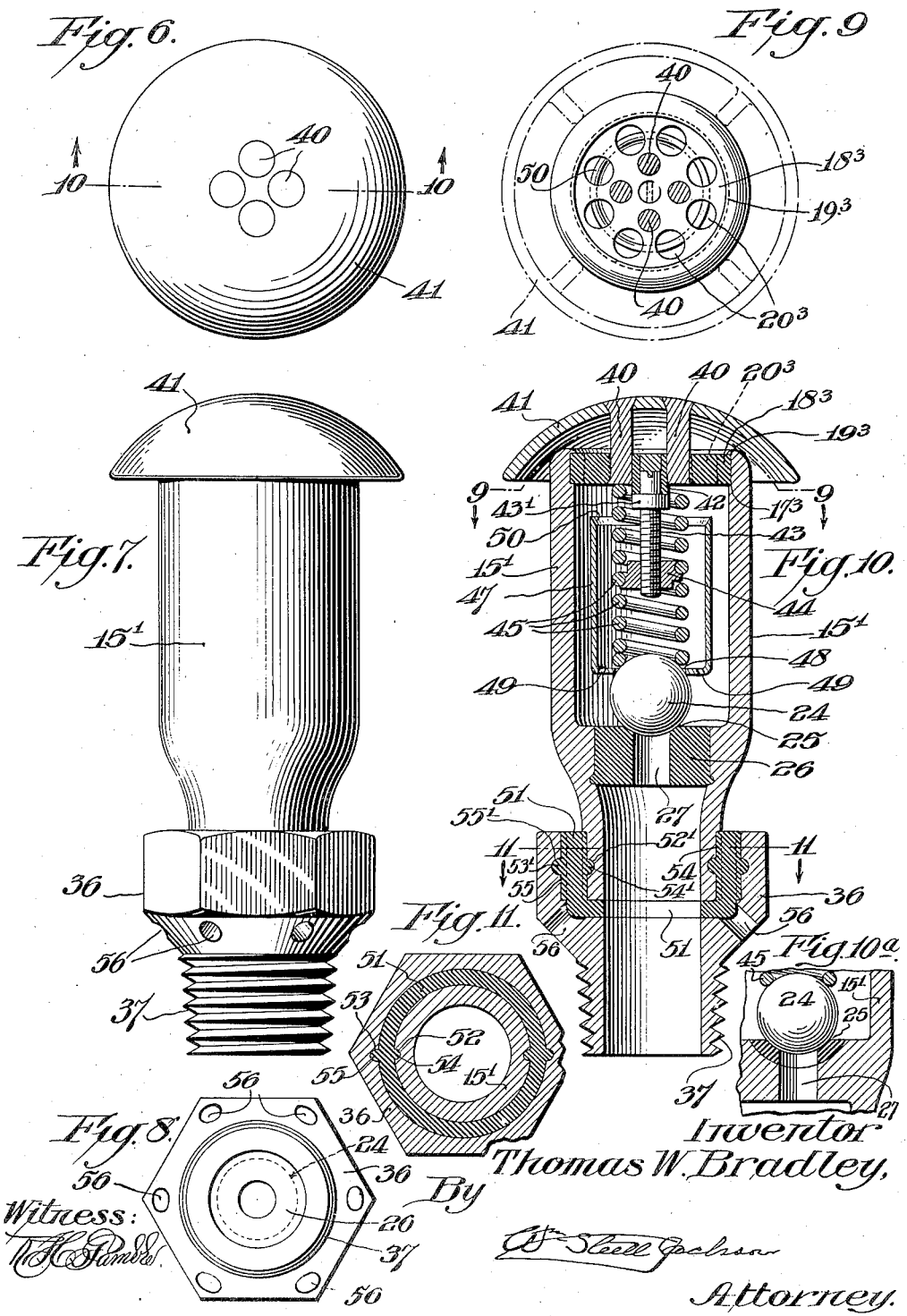

Patented Apr. 7, 1936

2,036,391

UNITED STATES PATENT OFFICE 2,036,391

RELIEF VALVE FOR UNFIRED PRESSURE VESSELS

Thomas W. Bradley, Philadelphia, Pa.

Application June 28, 1930, Serial No. 464,510
Renewed October 5, 1935

17 Claims. (Cl. 137—53)

This invention relates to relief valves and more particularly to relief valves which are adapted to afford relief to unfired pressure vessels.

The main purpose of my invention is to provide a relief valve which will act to release air or gas under an excess of pressure at normal temperature, and to release both air and gas or vapor content under pressure due to excessively high temperature.

A further purpose is to provide means for regulating the pressure at which the valve will function to release air or gas and to provide means for the release of contents at a given temperature.

A further purpose is to provide a temperature-controlled exhaust port which will act to release the contents through a restricted area at a given temperature, and a second means which will act at a higher temperature to release a greater area.

A further purpose is to provide a valve which will function to release at a plurality (here three) given degrees of heat, each one higher than the former and to release through different areas.

A further purpose is to provide means for destroying one fusible metal exhaust port should it fail to function in time to release a second fusible metal exhaust port.

A further purpose is to provide fusible metal plugs which will melt at given temperatures, to provide means for sealing them within the valve casing so as to prevent their turning and working loose, and to provide ports leading from the outside to the fusible metal parts to enable them to melt more readily under high temperatures.

A further purpose is to protect a valve of the character indicated from clogging by dirt and dust.

A further purpose is to cause a dust or dirt guard to be ejected with fusible matter when the temperature rises unduly.

A further purpose is selectively to control the temperature to which a relief valve is set, whether separately used or used in conjunction with a fusible relief device and to seal the valve as set against interference with the setting.

A further purpose is to mechanically assist in cutting a suitable relief device during the ejecting movement of a valve element and whether the fusible material be weakened by temperature rise or not.

A further purpose is to operate the valve by a toggle, using a lateral spring upon it to give greater effective assistance for the return of the valve to its seat where large valves and high pressures are involved, avoiding closure of the toggle and consequent locking of the valve upon its seat and to so construct the valve and coacting parts as readily to permit their ejection when the outermost fusible member is destroyed.

A further purpose is to lessen the cost of fusible metal members by inserts of cheaper metals.

A further purpose is to utilize a fusible metal member as an adjusting means for the valve spring whereby the tension of said spring can be varied by the positioning of the fusible metal member.

Further purposes will appear in the specification and in the claims.

I have preferred to illustrate my invention by several different forms only, among many in which it may appear, selecting forms which are practical and inexpensive and which well illustrate the principles involved.

Figure 1 is an elevation of a preferred form of my valve, shown applied to a tank of which a fragment only is shown.

Figure 2 is a vertical section through the center thereof.

Figure 3 is a top plan view of Figure 1.

Figure 4 is a vertical section similar to Figure 2 showing a modification.

Figure 5 is a similar view showing a further modification.

Figure 6 is a plan view of another design of valve.

Figure 7 is an elevation thereof.

Figure 8 is a bottom view of Figure 7.

Figure 9 is a horizontal section on line 9—9 of Figure 10.

Figure 10 is a vertical section corresponding to line 10—10 of Figure 6.

Figure 10a is a fragmentary sectional view showing an alternate construction.

Figure 11 is a horizontal section on line 11—11 of Figure 10.

Figure 12 is a plan view of a similar valve where higher pressures are to be taken care of.

Figure 13 is a section on line 13—13 of Figure 12.

Figure 14 is a horizontal section on line 14—14 of Figure 15.

Figure 15 is a vertical section on line 15—15 of Figure 13.

Figure 16 is a detailed vertical section of the top of a valve casing showing an adjustable fusible metal member with a reinforcing metal insert.

In the drawings similar numerals indicate like parts.

My invention is primarily intended to be applied to unfired pressure vessels of which many and greatly variant types exist.

For the purpose of example only, and to illustrate their variant character I might suggest that my invention is also suitable for use in conjunction with grease tanks used in garages and filling stations for high pressure service, ammonia tanks in refrigerating plants, air compressor receivers and discharge lines, acetylene tanks and heaters.

The pressure per cubic inch in these vessels may become very high and the danger of explosion in case of fire is very great. It will be quite obvious to anyone familiar with this art that the invention is applicable to any vessel carrying a high pressure and which may be subjected accidentally or otherwise to excessive heat.

Figures 1 to 3 illustrate a preferred form of valve wherein 14 indicates a fragment of the top of a tank, and 15 the outer casing of the valve proper, which is cylindrical in horizontal cross-section and is threaded into the vessel at 16.

The top of the casing 15 is initially open and is provided with a seat 17, into which is fitted a perforated fusible disc 18. This disc may be sealed in place by a slight flanging of the outer casing as shown at 19 or otherwise, as seen in one form, Figure 16, and is further provided near its outer edge with a series of openings 20.

The fusible disc 18 is centrally perforated to support a screw-threaded shaft 21 which carries a spring-adjusting member 22 within a coil spring 23.

The upper end of the spring 23 bears against the under side of the fusible disc 18, and the opposite end against a ball or other valve member 24 closing against a seat 25 in a metal plug 26, preferably of fusible material.

This plug 26 may be held within the casing 15 by a flange 26' upon the bottom thereof, seated within a corresponding groove in the casing, and is provided with a passage 27.

In practice the shaft 21 is turned with a screw driver until the spring supporting member 22 is in a position to cause the spring 23 to exert the desired pressure. It is then sealed in place at 33.

The fusible disc 18 is weakened by the closeness of the perforations as indicated at 18' of Fig. 3. The perforations permit flow of gases (due to excessive pressure) even in the absence of temperature rise. They are arranged in circular form.

It is the purpose to so proportion the size of openings 20, thickness and fusing temperature of the fusible disc 18, the small or larger connecting web of metal 18' between the perforations, to the size of the opening 27, the thickness of the metal of the plug 26 and the fusing temperature at which this plug 26 is intended to weaken, in order that one of these fusible elements will go before the other.

I plan to have the disc 18 weaken and discharge prior to the weakening and discharge of the plug 26, and, therefore, correspondingly adjust the number, size, stiffening effect, thickness and temperature of melting of this disc 18, so that with rise in temperature fluid will be released fully through it before release of the plug 26.

In order that my device may be affected by temperature within the room, as well as by the temperature of gases or vapors within the vessel (as an additional fire protection) I provide openings 30 about the disc 18 and/or openings 31 (Figure 4) about the plug 26 to permit access of flame directly to the fusible material in case of outside fire.

The adjusting member 22 is preferably applied in the form of a nut upon the shaft 21 and the shaft is retained against movement in an upward direction by a collar 32 pressing against the lower end of the disc, or (if it be desired to prevent movement in both directions) by a collar 32' located within the metal of the disc as shown in Figure 5.

In either case after adjustment has been made the space between the top of the screw and the upper part of the disc 18$^1$ or 18$^2$ may be filled by fusible metal 33 to prevent alteration of the setting.

Much of my invention applies without regard to whether the adjusting mechanism for the spring strength be used or not and the device has been illustrated free from the adjusting mechanism in Figure 4 to point out this fact.

Figure 5 is shown for the purpose chiefly of illustrating the capability of adjusting the spring either by compressing the spring above the nut to allow further expansion of the portion of the spring below or by forcing the spring below the nut down to give additional compression of this spring. In Figure 2 adjustment of the compression of the spring below the nut alone is permissible.

Since there can be no tension of the spring between the nut 22 and the valve the only adjustment which can be made is one of extent of compression of that portion of the spring lying between the nut and the valve. In the form of Figure 5 it is possible to compress additionally the portion of the spring lying between the nut and the head of the screw, reducing the normal extent of compression of the part of the spring between the nut and the valve. With reverse movement of the nut this portion of the spring between the nut and valve can also be additionally compressed. In the form shown in Figure 2 this additional compression is the only adjustment that can be made.

It is advantageous to have the seat for the valve element (the ball 24) in the soft fusible metal, as the constant pressure on the ball by the spring 23 will cause the ball to form its own seat.

In operation the contents of the vessel, whether viscous, liquid or gaseous is introduced, preferably near the bottom, and the vessel is filled until the pressure inside reaches that at which the valve is intended to release.

If the content be viscous or liquid, air will then begin to pass out through the valve when the intended pressure has been reached. In case of gas content, mixed gas and air will begin to pass out at the pressure for which the spring has been adjusted.

The valve will continue to operate under these conditions unless exposed to heat so excessive as to cause expansion within to a pressure beyond that provided for by the spring. When a high temperature of this kind is reached, disc 18 will soon weaken and the spring 23, element 22 and screw 21 together with the valve 24 will be blown out of the casing and will permit much more free passage of heated air and content through the passage 27.

If the temperature be of sufficient height, the second fusible plug, 26 will melt and allow the contents to be ejected through a larger orifice, it being understood that the disc 18 is of larger metal area and has more exposed surface than that of plug 26 and may correspondingly be made always to melt first.

Gas or vapor above the air pressure will lift the valve 24 and will pass out through the opening 27 in the plug 26 and through the openings 20.

The question as to which plug will melt first is a composite question into which many other elements enter including the ratio of volume of plug to the surface exposure of hot gases or vapor.

The pressure of the spring 23 is effective to drive the center of the fusible disc 18 out as soon as the fusible material begins to weaken. The pressure of the spring upon the disc 18 will be greater, of course, as the ball is lifted than when the ball is seated and will increase with the extent to which the ball is lifted.

The openings 31 are desirably larger than openings 30 because of the larger bulk of fusible material 26 as compared with the disc 18.

In the form of my invention shown in Figures 6 to 11 inclusive, 15' indicates a valve casing, restricted at its lower end and seated within a receptacle 36, threaded at 37 for attachment to a vessel.

A disc of fusible metal 18$^3$ is secured in a seat 17$^3$ in the upper end of the casing and held in place by flanging as shown at 19$^3$. The disc is further provided near its outer edge with a series of openings 20$^3$ to permit the escape of air, and near its center with supporting posts 40 to hold a cap 41.

This cap is supported a sufficient distance above the disc 18$^3$ to permit air to escape freely through openings 20$^3$ but is of such shape as to cover the openings above and cover the edges of the casing 15', thereby preventing the accumulation of dust and dirt in the openings 20$^3$.

The disc 18$^3$ is further provided on its under side with a centrally located lug 42 which forms a support for a screw-threaded shaft 43 which in turn carries a spring tension adjusting collar 44 surrounded by a coil spring 45. The upper end of the coil spring 45 surrounds the lug 42 and rests against the under side of the disc 18$^3$, while its lower end rests upon a ball 24 seated at 25 within a fusible metal plug 26. It will be seen that this form, so far as described, is closely similar to the form shown in Figure 2.

The screw-threaded shaft 43 has a collar 43' integral therewith which bears against the lug 42.

The outer face of the collar 44 is grooved to correspond to the convolutions of the coil spring 45 which fit therein, as in the case in Figure 2. The fusible metal plug 26 is held within its seat in the same manner as in Figures 2, 4 and 5.

Carried upon the upper part of the ball 24 and surrounding the coil spring 45 is a cup-shaped member 47, having a bearing portion 48 in its bottom to form a seat upon the ball. It carries also a series of smaller openings 49 to prevent the cup from collecting moisture from condensation. The upper periphery of this cup is in line with the centers of the openings 20$^3$ in the disc 18$^3$ and is sharpened to a knife edge 50.

The casing 15' is restricted at its lower end and is held within the receptacle 36 by a fusible sleeve 51, seen in Figures 10 and 11.

In order to prevent the casing from turning within the seat of the receptacle 36 and thereby working loose, I provide flutes 52 within the casing 15' and flutes 53 within the receptacle 36.

When the fusible metal is poured into the socket it will fill the flutes with metal as at 54, 55. For a like purpose and in order to prevent the withdrawal of the valve casing vertically from the seat I further provide an annular groove 52' within the casing 15' and another 53' within the receptacle 36 and the fusible metal when poured in its molten state forms annular flanges 54' and 55' respectively within these grooves.

Receptacle 36 can be parted at 56 to permit heat to reach the fusible metal therein more quickly. Likewise it can be parted as in Figure 4 to reach the plug 26 and the disc 18$^3$.

In operation, the introduction of the content to the vessel is the same as in the prior forms, and the ball 24 is raised from its seat by the force of the air or gas and is returned to its seat by the pressure of the spring below the tension adjusting collar.

When the valve is subjected to intense heat the disc 18$^3$ of fusible metal will melt and permit the cap 41, spring 45, screw shaft 43, ball 24 and cup-shaped member 47 to be blown from the casing, and the heated air and content can escape through the opening in the plug 26.

If for any reason the plug 26 should melt prior to the disc 18$^3$, the force of air trying to escape from the vessel will drive the ball 24 and therewith the cup member 47 against the center of the perforations in the disc 18$^3$ and the knife edge 50 will cut its way through the thin webbings between the openings 20$^3$, thereby releasing the interior of the valve structure as above.

Any further rise in temperature will cause the fusible metal within the receptacle 36 to melt and release the entire valve casing 15' allowing an unrestricted opening to atmosphere.

It will be obvious that pressure alone without temperature increase would be effective if sufficiently high to cause the cup member to cut the fusible material between the perforations.

If desired the fusible metal in the disc 18$^3$ can have a lower melting point than that of the plug 26, while the fusible metal 51 within the receptacle 36 can have a higher melting point than the plug 26, thus assuring the melting, first of the disc 18$^3$, second of the plug 26 and third of the metal 51.

It will be further observed that with the removal of the disc 18$^3$ the exhaust opening is limited to the area of the port 27. With the destruction of the plug 26 the area of the opening is increased, and with the destruction of the fusible metal element 51 a quicker exhaust to atmosphere is obtained.

In Figure 10a I have illustrated an alternate wherein the valve seat 25 for the ball 24 is integral with the casing 15' and of a non-fusible metal. In this form the ball valve works as in all the other forms here described for the discharge of air, but there is but one fusible metal plug, that at the base of the casing, so that when the fusible metal melts the entire valve is blown out of its seat without destroying the interior of the valve as in the other forms.

It may be desirable under certain conditions, such as, for example, where larger tanks and higher pressures are encountered, to attach my pressure element within the casing in a horizontal position and combine it with a toggle motion to keep the valve closed upon its seat.

I illustrate such a toggle motion in Figures 13, 14 and 15, wherein spring tensioning members are carried which project from the inside of the side wall of the casing in line with a break in the toggle motion 60. This toggle motion consists of two levers 61 and 62 pivoted together at 63 and having their outer free ends 64 and 65 terminating in balls. The ball on the lever 61 rests within a socket 66 in the under side of a plate 67 which forms the hard metal part of a composite metal plug, 18$^4$, the fusible metal portion being designated at 68. The ball on the lever 62 rests within a socket upon the upper face of a valve 24'.

The spring action upon the toggle is set to the required tension from outside the side wall by turning the threaded shaft with a screw driver. When the desired tension is obtained the driver is removed and the hole filled with a soft metal which tends to maintain the adjusted screw in position.

From a socket formation 70 within one side of the casing 15, I project a threaded shaft 43² corresponding to the shaft 43 in Figure 10 and to 21 in Figures 2 and 5. This shaft carries a threaded nut 44' having its outer face conforming to the convolutions of a tension spiral spring 45'.

A substantially spherical shaped portion 43⁴, integral with the shaft 43², rests within the socket 70 and forms a support for the threaded shaft 43². One end of the spiral spring 45' rests against the inside of the side wall of the casing, is supported near midway of its length by the nut 44' and at the opposite end is attached to the toggle motion at its joint 63.

The outer free end of the threaded shaft 43² projects to a point where it comes in contact with the toggle, which prevents the two arms 61 and 62 from assuming a perpendicular position. This would cause the toggle to lock.

The spring 45' holds the toggle 60 under constant tension, tending to force the valve 24' closed upon its seat 25', which is formed within a fusible metal plug 26², apertured at 27'.

The valve is guided within the aperture by a ribbed projection 24² depending from its under face and riding within the walls of the aperture 27'. The valve is further guided by rods 71 carried by ears 72 projecting from the upper face of the valve 24'. The outer free ends of the rods ride within grooves 73 formed within the side walls of the casing and extend from the line of the valve seat 25' upwardly to a point in line with the bottom of the plate 67. The upper ends of the grooves are open as at 73' to permit the insertion and ejection of the guide rods 71.

The composite metal plug 18⁴ has a central portion 67 and is surrounded by a perforated fusible metal portion 68', the perforations being designated at 68². The central portion has an annular groove 67' into which the fusible metal portion is moulded, thereby assisting in locking these two metals together.

In the form of my invention illustrated in Figure 16, I have shown practically a duplication of the upper portion of Figure 4, the difference being I have internally threaded the casing 15 and externally threaded a composite plug 75 to fit therein. By using the openings 75' normally intended for the escapement of air or gas under pressure, for the insertion of a spanner wrench, I can raise or lower the plug and thereby vary the tension of the spring 23. When this is done enough axial pressure should be brought upon the plug to nearly balance the spring pressure so as to relieve the threads from excessive wear.

In operation, the valve is raised from its seat by the pressure of air or gas within the vessel, (causing the toggle to open against the spring tension) and is returned to its seat by the action of the spring which tends to straighten the two arms 61 and 62 of the toggle motion and close the toggle.

The valve is guided to its seat from below by the ribbed projection 24² and from above by the guide rods 71 riding in the grooves 73 in the side walls of the casing.

The valve continues to function in this manner as long as the temperature surrounding the valve is not excessive. If excessive heat be encountered, the fusible metal portion 68 of the composite plug 67 will melt, and the hard metal part will be raised by the action of the tension spring tending to straighten the toggle and bring it into a perpendicular position.

When the toggle straightens the free end of the threaded shaft 43² will be raised also, due to the connection of spring 45' with the toggle, tending to unseat the substantially spherical portion 43⁴ of the shaft 43² and help to position it for ejection.

With the parts in the above position and with the air or gas pressure seeking to escape, the valve 24' will be forcefully raised from its seat and all the elements connected with it, i. e. the two toggle arms 61 and 62, the plate 67, the tension spring 45' and shaft 43² together with the nut 44' will be ejected from the casing, allowing the air or gas to escape through aperture 27'. As the parts leave the casing they are guided by rods 71 traveling within grooves 73.

Any considerable further increase in temperature will cause the fusible metal plug 26² to melt, thereby creating a much larger opening for the escape of the air or gas under pressure.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:—

1. In a relief valve, a casing having a valve seat facing away from the pressure end of the casing, a valve engaging the seat, an apertured fusible plug at a distance outside of the seat, a spring restrained by the plug and holding the valve to its seat whereby pressure free from high temperature will lift the valve and discharge through the aperture and with increased temperature will discharge the valve and spring along with the fusible element.

2. In a relief valve, a casing having a valve seat of fusible metal facing away from the pressure end of the casing, a valve engaging the seat, an apertured fusible plug at a distance outside of the seat, a spring restrained by the plug and holding the valve to its seat whereby pressure free from high temperature will lift the valve and discharge through the aperture and with increased temperature will discharge the valve and spring along with the fusible element.

3. In a relief valve, a casing, a perforated fusible metal disc fastened within the casing, a fusible metal plug fastened within the casing and having a passage therethrough with a valve seat at its upper end, a valve normally within the seat, and a coil spring interposed between the valve and the perforated metal disc to keep the valve normally in its seat.

4. In a relief valve, a casing having a valve seat of fusible metal facing away from the pressure end of the casing, a valve engaging the seat, an apertured fusible plug at a distance outside of the seat, a screw bearing against the fusible plug, a nut adapted to be advanced or retracted by the screw, a spring connection between the nut and the spring whereby the pressure of the spring against the valve is determined by the positioning of the nut on the screw, and whereby pressure free from high temperature will lift the valve and discharge through the aperture and with increased temperature will discharge the valve, the screw and its nut and the spring together with the fusible element.

5. In a relief valve, a casing having a valve seat of fusible metal facing away from the pressure end of the casing, a valve engaging the seat, an apertured fusible plug at a distance outside of the seat, a spring restrained by the plug and holding the valve to its seat whereby pressure free from high temperature will lift the valve and discharge through the aperture and with increased temperature will discharge the valve and spring along with the fusible element.

6. In a relief valve, a casing, a spring-pressed valve member opening away from the pressure end of the casing, a fusible metal disc restraining the spring of the valve and apertured for exhaust of gas under pressure and a cap attached to the disc protecting the disc from foreign matter and by reason of the gas discharge bringing additional pressure on the disc to cause it to be expelled.

7. In a relief valve, a casing, a spring-pressed valve adapted to open away from the pressure end of the casing, a weakened disc holding the spring and apertured to allow gas to pass through it under pressure, and a cutter for the disc engaged by the valve and under excessive pressure adapted to be pressed against the disc by said valve.

8. In a relief valve, a casing, a fusible disc near the outer end of the casing apertured for passage of air and gas under pressure, a spring-pressed valve inside of the casing having the spring tending to expel the disc, a cap over the disc adapted with the discharge of gas to additionally strain the disc outwardly, and a cutter for the disc carried by the valve and adapted to engage the disc with excessive valve opening.

9. In a relief valve, a body having a valve seat at its inner end, a valve engaging the seat, a perforated member at the outer end of the body adapted to weaken with increase of temperature and permitting passage of air and gas through the perforations, and a spring-extended toggle connection between the valve which engages the seat and the perforated member, bringing the toggle pressure upon the member to be heat-weakened and adapted to be blown from the body when the perforated member gives way.

10. In a relief valve, a body having a valve seat at its inner end, a valve engaging said seat, a perforated member at the outer end of the body adapted to weaken with increase of temperature and permitting passage of air and gas through the perforations, a spring-extended toggle connection between the valve which engages the seat and the perforated member, bringing the toggle pressure upon the member to be heat-weakened and adapted to be blown from the body when the perforated member gives way, and an adjustment for the strength of the spring tending to straighten the toggle.

11. In a relief valve, a body having a valve seat at its inner end, a valve engaging said seat, a perforated member at the outer end of the body adapted to weaken with increase of temperature and permitting passage of air and gas through the perforations, a spring-extended toggle connection between the valve which engages the seat and the perforated member, bringing the toggle pressure upon the member to be heat-weakened and adapted to be blown from the body when the perforated member gives way, and an adjustment for the strength of the spring tending to extend the toggle, the adjustment being accessible from the outside.

12. In a relief valve, a body having a passage through it, a heat-weakened apertured member near the inner end of the body providing a valve seat and destructible with high temperature, a valve engaging the seat, a second heat-weakened apertured member within the passage of the body permitting normal discharge of air and gas through the apertures, a toggle engaging the valve and heat-weakened member, and a spring engaging the toggle and adapted to cause the toggle to straighten, the toggle being set in position so the valve can be forced open against the spring.

13. In a relief valve, a body having a spring-closed valve therein and an apertured composite fusible member beyond the valve, the composite member comprising fusible apertured material about the outer part and a non-fusible core to receive the pressure of the spring.

14. In a relief valve, a tubular body, an apertured fusible member threaded into the outer part of the body and adjustable by the thread to vary its position, a valve seat in the inner end of the body, a valve cooperating with the seat and a spring in the tubular body toward the outer end of the body from the valve seat, contacting the fusible member at one end and the valve at the other end.

15. In a relief valve, a tubular body, an apertured fusible member threaded into the outer part of the body, adjustable by the thread to vary its position, and a spring pressed valve construction within the tubular body, located wholly toward the inner end of the body from the fusible material and exerting the spring pressure against the inside of the fusible material.

16. In a relief valve, a tubular body and an apertured composite fusible member threaded into the outer part of the body, adjustable by the thread to vary its position, the interior of the fusible member being of non-fusible material, and a spring-pressed valve located toward the inner end of the tubular body from the fusible material and exerting the spring pressure against the non-fusible part of the composite fusible closure.

17. In a relief valve, a tubular casing having an internal passage adapted to communicate at one end with a chamber to be protected, a fusible plug forming a valve seat within the casing near the end communicating with the chamber, a valve adapted to engage the seat, a second fusible plug extending across the end of the passage away from that in communication with the chamber and apertured to pass gas or air under pressure when the valve is lifted and a spring urging the valve toward closure, supported by the second fusible plug and adapted to be blown out bodily in case of fusion of the second fusible plug.

THOMAS W. BRADLEY.